United States Patent
van Baar et al.

(10) Patent No.: US 9,424,650 B2
(45) Date of Patent: Aug. 23, 2016

(54) SENSOR FUSION FOR DEPTH ESTIMATION

(71) Applicant: Disney Enterprises, Inc., Burbank, CA (US)

(72) Inventors: Jereon van Baar, Kusnacht (CH); Paul A. Beardsley, Zurich (CH); Marc Pollefeys, Zurich (CH); Markus Gross, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 483 days.

(21) Appl. No.: 13/915,899

(22) Filed: Jun. 12, 2013

(65) Prior Publication Data

US 2014/0368615 A1 Dec. 18, 2014

(51) Int. Cl.
*G06T 15/10* (2011.01)
*G06T 7/00* (2006.01)
*G01S 17/02* (2006.01)
*G01S 17/89* (2006.01)

(52) U.S. Cl.
CPC ............ *G06T 7/0075* (2013.01); *G01S 17/023* (2013.01); *G01S 17/89* (2013.01); *G06T 15/10* (2013.01); *G06T 2200/04* (2013.01); *G06T 2207/10012* (2013.01); *G06T 2207/10028* (2013.01); *G06T 2207/20221* (2013.01)

(58) Field of Classification Search
None
See application file for complete search history.

(56) References Cited

U.S. PATENT DOCUMENTS

| 8,564,595 B1 * | 10/2013 | Ho | A63F 13/00 345/426 |
| 2002/0015048 A1 * | 2/2002 | Nister | G06T 7/0065 345/625 |
| 2015/0178988 A1 * | 6/2015 | Montserrat Mora | G06T 13/40 345/420 |

\* cited by examiner

*Primary Examiner* — Phi Hoang
(74) *Attorney, Agent, or Firm* — Patterson & Sheridan LLP

(57) ABSTRACT

To generate a pixel-accurate depth map, data from a range-estimation sensor (e.g., a time-of flight sensor) is combined with data from multiple cameras to produce a high-quality depth measurement for pixels in an image. To do so, a depth measurement system may use a plurality of cameras mounted on a support structure to perform a depth hypothesis technique to generate a first depth-support value. Furthermore, the apparatus may include a range-estimation sensor which generates a second depth-support value. In addition, the system may project a 3D point onto the auxiliary cameras and compare the color of the associated pixel in the auxiliary camera with the color of the pixel in reference camera to generate a third depth-support value. The system may combine these support values for each pixel in an image to determine respective depth values. Using these values, the system may generate a depth map for the image.

20 Claims, 7 Drawing Sheets

SENSOR FUSION FOR DEPTH ESTIMATION

BACKGROUND

1. Field of the Invention

Embodiments presented in this disclosure generally relate to generating depth maps, and more specifically, to generating depth maps by fusing data received from sensors of different modalities.

2. Description of the Related Art

A computing device may be coupled to a camera or a combination of sensors to assist in producing higher quality images or in reconstructing a scene. One way of accomplishing this is by performing depth sensing where the distance between a point in a scene and a camera (usually a reference camera) is determined. By measuring the depth for a plurality of pixels in a reference image, a depth map for the reference image may be acquired.

To measure depth, some systems use a time of flight (ToF) sensor. ToF sensors send out light and measure the time it takes for the light to travel from the sensor to an object, and then back to the sensor. By measuring this round-trip travel time, the distance from a plurality of points in the scene to the ToF sensor may be measured in real time. For example, the ToF sensor may be a scannerless light detection and ranging (LIDAR) sensor which generates a plurality of depth measurements for a plurality of different points that may be used to form a depth map for an image. However, ToF sensors, especially inexpensive ones, may not provide a depth measurements at a resolution level sufficient to support the depth map computation of a reference image (e.g., an HD image), resulting in low quality depth maps which may limit the types of processing that can be performed on the reference image. For example, a pixel-accurate depth map may increase the ability to distinguish between different layers of the reference image when adding special effects.

SUMMARY

Embodiments presented herein include a method and computer-readable product for calculating a depth value for a pixel in a reference image. The method and computer-readable product include receiving the reference image captured by a reference camera and at least one auxiliary image captured by an auxiliary camera receiving a first support value indicating whether the pixel in the reference image is at a particular depth, relative to the reference camera, based on comparing a region of the auxiliary image captured by the auxiliary camera with a region of the reference image captured by the reference camera. The method and computer-readable product include providing a depth estimate of the pixel from a range-estimation camera and receiving a second support value indicating whether the pixel in the reference image is at the particular depth based on comparing the depth estimate from the range-estimation camera to the particular depth. The method and computer-readable product include receiving a third support value indicating whether the pixel is at the particular depth based on projecting a 3D point, corresponding to the pixel in the reference image, onto the auxiliary image and fusing the first, second, and third support values to generate a total support value for the pixel at the particular depth.

Another embodiment includes a system with a common support that includes a reference camera, at least one auxiliary camera, and a ToF camera. The system includes a computing device communicatively coupled to the reference, auxiliary, and ToF cameras, the computing device configured to calculate a first support value indicating whether a pixel in a reference image captured by the reference camera is at a particular depth, relative to the reference camera, based on comparing a region of the reference image with a region of an auxiliary image captured by the auxiliary camera and calculate a second support value indicating whether the pixel in the reference image is at the particular depth based on comparing a depth estimate from the range-estimation camera to the particular depth. The computing device is further configured to calculate a third support value indicating whether the pixel is at the particular depth based on projecting a 3D point, corresponding to the pixel in the reference image, onto the auxiliary image and fuse the first, second, and third support values to generate a total support value for the pixel at the particular depth.

Another embodiment includes a method for adjusting a depth value for a pixel in an image. The method includes providing a depth map associated with the image, wherein the depth map comprises respective depth values for a plurality of pixels in the image and grouping a subset of the plurality of pixels into a super pixel based on comparing respective thermal values associated with neighboring pixels. The method includes estimating a depth plane for the super pixel based on the respective depth values of the subset of the plurality of pixels and adjusting at least one of the respective depth values by comparing the respective depth values of the subset of the plurality of pixels to the estimated depth plane.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
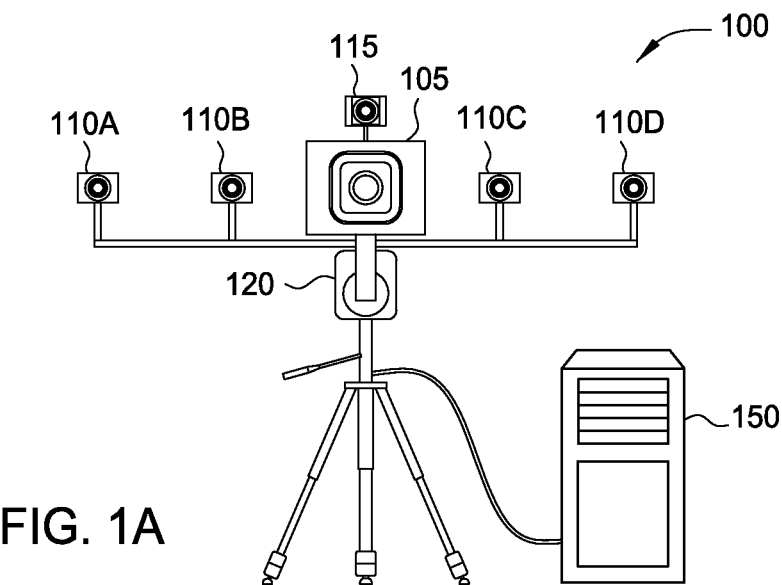
FIGS. 1A-1C illustrate different perspective views of an apparatus supporting a plurality of sensors of various modalities, according to embodiments described herein.

To generate a pixel-accurate depth map, in one embodiment, ToF data from a range-estimation sensor (e.g., a ToF sensor) is combined with data from multiple cameras to produce a high-quality depth measurement for pixels in an image. To do so, a depth measurement system may use a plurality of cameras mounted on a support structure to perform a depth hypothesis technique (e.g., plane sweeping) to generate a first depth-support value. Furthermore, the apparatus may include a mounted ToF sensor which generates a second depth-support value based on depth estimates provided in the ToF data. In addition, the depth measurement system may project a 3D point (i.e., a pixel at a particular depth) from a reference image captured by a reference camera onto an auxiliary image captured by one or more auxiliary cameras. By comparing the color of the corresponding pixels in the auxiliary image with the color of the 3D point in the reference image, the system generates a third depth-support value. The system may then combine (i.e., fuse) these support values for each pixel in the reference image to determine respective depth values. Using these values, the system may generate a depth map for the image.

In one embodiment, the depth-measurement system may perform a plane fitting technique for further adjusting the depth values in the depth map. Generally, plane fitting involves grouping a plurality of pixels into a super pixel based on the similarities in color. However, because different layers in an image may have the same color (e.g., a person may be wearing clothes that match the color of the background), the system may also use data from a thermal sensor when grouping the pixels. That is, the thermal value assigned to each pixel may be used as a separate factor when grouping the pixels into super pixels. Once grouped, the system may assign a depth plane to the pixels and adjust the depth values of pixels that substantially vary from this depth plane.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and block diagrams of methods, apparatus (systems) and computer program products according to embodiments of the invention. It will be understood that each block of the flowchart illustrations and block diagrams, and combinations of blocks in the flowchart illustrations and block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and block diagram block or blocks.

Figure 1B:
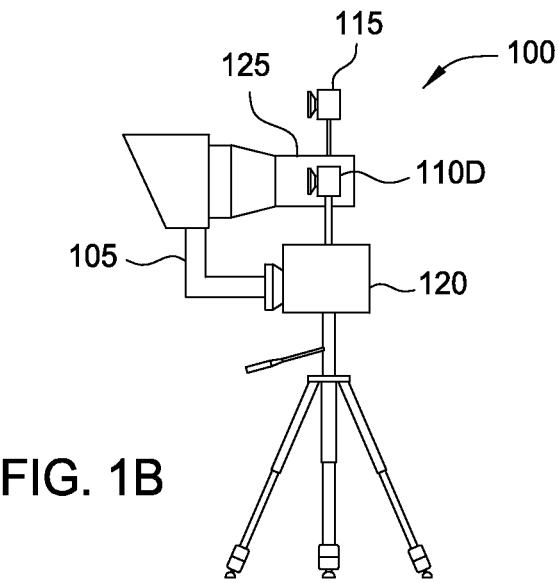
Figure 1C:
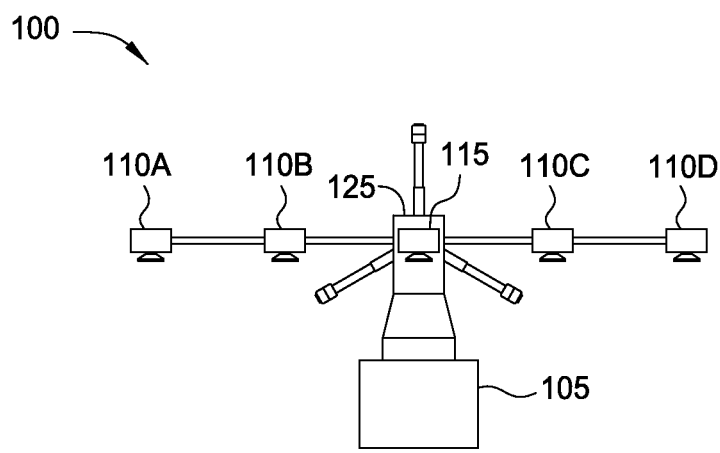

FIGS. 1A-1C illustrate different perspective views of an apparatus 100 supporting a plurality of sensors of various modalities, according to embodiments described herein. Specifically, FIG. 1A provides a front-side view of apparatus 100 and the mounted cameras. As used herein, the term "sensor" and "camera" are used interchangeable. Moreover, the term "camera" may describe sensors that detect other forms of electromagnetic radiation besides visible light—e.g., range-estimation sensor or thermal/heat sensors. In other embodiments, the cameras may detect differences in reflected electromagnetic radiations from active illumination—e.g., range-estimation depth sensors such as ToF sensors. Apparatus 100 includes a reference camera (not shown) flanked on each side by two auxiliary cameras 110A-D. In FIG. 1A, the view of the reference camera is blocked because of beam splitter 105 which is positioned in front of the reference camera. The beam splitter 105 filters received electromagnetic radiation such that visible light is transferred to the reference camera and infrared radiation is transferred to a thermal camera 120 positioned below the reference camera. In this embodiment, the reference camera and the auxiliary cameras 110A-D are visible light cameras that capture images which may be used for generating media content.

Because of the positioning of auxiliary cameras 110A-D relative to the reference camera, auxiliary cameras 110A-D capture images of a scene from different perspectives. For example, an object in the foreground may occlude a different portion of the background when viewed from the perspective of auxiliary camera 110D relative to the perspective of the reference camera or auxiliary camera 110A. In one embodiment, auxiliary cameras 110A-D may be space equidistant—i.e., the spacing between camera 110A and 110B is the same as the spacing between camera 110B and the reference camera, between the reference camera and camera 110C, and between camera 110C and camera 110D. Moreover, although four auxiliary cameras are shown, this is not a requirement. For example, apparatus 100 may include auxiliary cameras 110 only on one side or may include only one camera 110 on each side. Additionally, apparatus 100 may be modified such that more than two auxiliary cameras are located on each side of the reference camera, or auxiliary cameras may be positioned on additional sides of the reference camera than the ones shown, or at any other perspectives relative to the scene.

Apparatus 100 includes a ToF camera 115 mounted above the reference camera. As discussed earlier, the ToF camera 115 measures the distance between itself and various objects in its field-of-view. This present embodiments are not limited to any particular type of ToF camera 115 and may include LIDAR systems, RF-modulated light sources, and the like. Moreover, ToF camera 115 may be mounted at different locations of apparatus 100 than the one shown.

Beam splitter 105 may transmit the IR radiation to the thermal camera 120 but route the visible light to the reference camera. This results in the reference camera and thermal camera 120 sharing the same perspective (i.e., their captured images are in registration). However, this is not necessary, and in other embodiments thermal camera 120 may have a different perspective than the reference camera.

Generally, apparatus 100 may be any support structure (e.g., a tripod or stand) that is capable of supporting the various cameras. In one embodiment, apparatus 100 maintains the orientation of the various modality cameras even as the apparatus 100 is moved (i.e., the cameras are rigidly attached to each other). That is, apparatus 100 is configured to hold the cameras in a fixed location relative to each other such that the distances between the cameras are maintained and an accurate depth map for captured images may be measured. Thus, once the different cameras are calibrated, apparatus 100 may be moved to a different location and still provide accurate depth maps. As will be appreciated by one skilled in the art, embodiments of this invention may include configurations wherein the various modality cameras are positioned at various locations relative to the scene and relative to each other (i.e., are not rigidly attached). Furthermore, in an embodiment the various modality cameras are not stationary and known in the art calibration methods may be used to dynamically calibrate the various cameras.

To generate the depth maps based on the data captured by the various cameras, apparatus 100 is coupled to a computing device 150. As will be discussed in greater detail below, computing device 150 may include the necessary software or hardware to calculate pixel-by-pixel depth values by fusing the data retrieved from the various cameras. For example, the computing device 150 may include a depth map application that takes data output from the cameras and provides a depth value for each pixel in a captured image (e.g., an image captured by the reference camera) in real time. In other embodiments, the depth map application may also perform post-processing to adjust fused depth values using a plane fitting technique and data retrieved from the thermal camera 120.

Although only one computing device 150 is shown, in other embodiments, calculating the depth maps may be distributed across multiple computing devices. For example, the cameras on apparatus 100 may include special-purpose processors for performing some of the calculations needed to assign a depth value to a pixel. Moreover, apparatus 100 may have additional (or fewer) cameras than the ones shown. For example, apparatus 100 may include any number of auxiliary cameras 110 or, in certain embodiments, may not include the thermal camera 120.

FIG. 1B illustrates a side view of apparatus 100. Here, the reference camera 125 is seen as being positioned to the right of the beam splitter 105. However, only one of the auxiliary cameras 110D is visible. As shown, the reference camera 125 may be different from the auxiliary cameras 110. For example, the reference camera may be a high-resolution camera while the auxiliary cameras are lower-resolution cameras. That is, the embodiments described herein may be used even if the visible light cameras 110 and 125 are not homogenous. Advantageously, having only one high-quality camera (e.g., reference camera 125) may reduce costs relative to using a homogenous multi-camera system of all high-quality cameras. Additionally, using lower-quality cameras as auxiliary cameras 110 may save space relative to homogenous systems. Regardless of whether a heterogeneous or homogenous multi-camera system is used, it is feasible that the different cameras may be integrated into a compact cinematographic camera body rather than being shown separately in FIGS. 1A-1C.

FIG. 1C illustrates a top view of apparatus 100. Note the embodiments discussed herein are not limited to the specific spacing and orientation of the cameras shown in FIGS. 1A-1C. One of ordinary skill in the art will recognize that the arrangement of the cameras on apparatus 100 may change and still enable the computing device 150 to calculate a pixel-by-pixel depth value for the images captured by reference camera 125.

Figure 2:
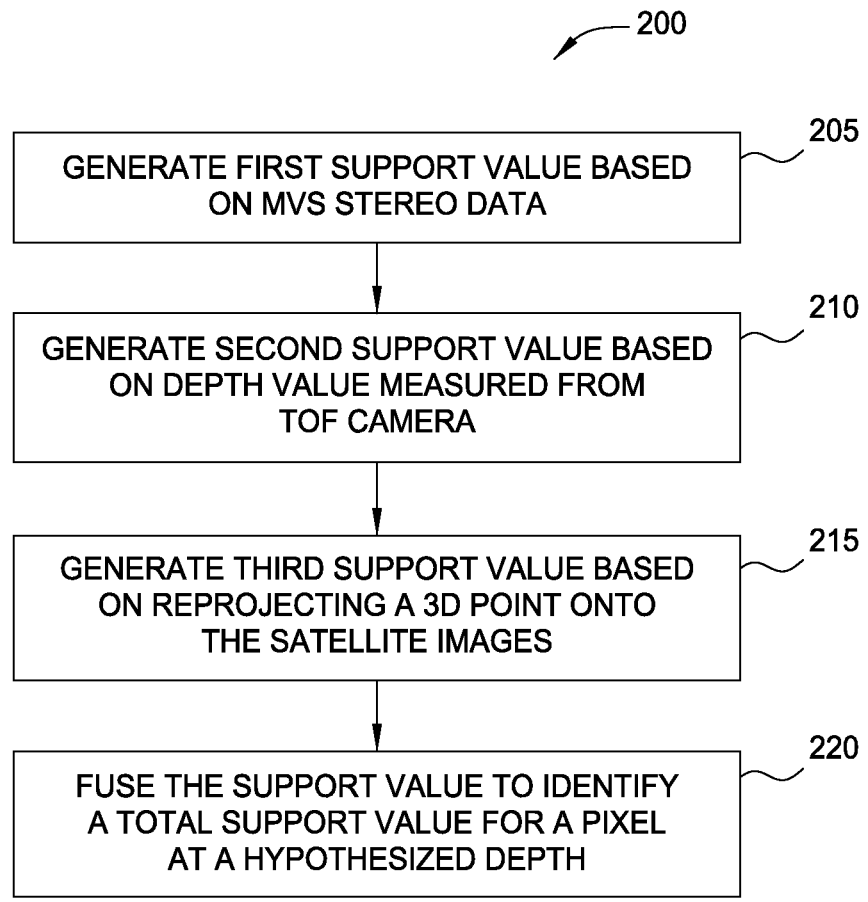
FIG. 2 illustrates a method for fusing data from sensors of different modalities to generate a pixel-by-pixel depth value, according to one embodiment described herein.

FIG. 2 illustrates a method 200 for fusing data from sensors of different modalities to generate a pixel-accurate depth value, according to one embodiment described herein. Generally, the depth map application may use the data provided by the various cameras mounted on apparatus 100 of FIG. 1A to determine a depth value for the pixels in a captured image. That is, instead of relying only on a ToF camera to provide a pixel depth value, the depth map application may use method 200 to calculate three support values which are then fused to provide a total support value for a particular depth. An equation for fusing the support values may be as follows:

$$E_p(x) = \omega_{st} \cdot E_{p,st} + \omega_{ToF} \cdot E_{p,ToF} + \omega_{re} \cdot E_{p,re} \quad (1)$$

In equation 1, $E_p(x)$ represents the total support for a pixel at a particular depth. As shown, the total support is the combination of a first support value ($E_{p,st}$) derived from multi-view stereo (MVS) data, a second support value ($E_{p,ToF}$) derived from the ToF camera, and a third support value ($E_{p,re}$) derived from reprojecting a 3D point associated with a pixel of the reference image onto images of the auxiliary cameras. Generally, the higher the total support value, the greater likelihood that the current depth being tested is the correct depth of the pixel. That is, equation 1 uses three different techniques for determining whether a particular hypothesized depth is the correct depth of the pixel. In one embodiment, the depth map application may find the total support for a pixel at a plurality of depths. The depth with the highest total support value is then assigned as the pixel's depth.

Moreover, Equation 1 includes respective weighting values ($\omega$) for each of the depth calculation techniques. The weights may be changed as desired to increase or decrease the contribution to the total support of the different techniques. For example, if the ToF camera is a low-quality sensor, its weighting factor ($\omega_{ToF}$) may be less than the weighting factors associated with the other depth calculation techniques—i.e., $\omega_{st}$ and $\omega_{re}$.

In one embodiment, the area in front of the reference camera may be divided into discrete depth values or planes. For each of these discrete depth values, the depth map application may calculate and then combine the three support values from the three depth calculation techniques to determine the total support for that depth. As discussed above, the discrete depth value with the greatest support—i.e., the greatest value of $E_p(x)$—is assigned as the depth of the pixel. The depth application may repeat this process for the other pixels in an image until a depth map is formed. In this manner, method 200 may be used to fuse together support values generated by the three different depth calculation techniques in order to identify a depth value for each pixel in a captured image. Equation 1 is just one example of fusing together multiple support values to form a total support value for a discrete plane depth. Other embodiments of fusing may include a non-linear combination of support values, using a variety of weights, using statistical correlations between the support values in order to determine a fused total support value, and the like.

Specifically, at block 205, the depth map application may generate the first support value from MVS data—i.e., the data received from the visible light cameras. Although a more detailed discussion of using MVS data to calculate the depth of a pixel is provided below in FIG. 3, generally, the data captured by the visible light cameras (e.g., reference camera 125 and auxiliary cameras 110 of FIG. 1A) is compared to determine similarities between pixels at a plurality of different hypothesized depths. The greater color similarity between a pixel of a reference image (i.e., an image captured by the reference camera) and the corresponding pixels in auxiliary images (i.e., the images captured by the auxiliary cameras), the greater likelihood the current depth is the correct depth, and thus, a greater value is assigned to ($E_{p,st}$) of Equation 1 for that particular pixel in the reference image. However, if the color of the reference image pixel and the color of the corresponding auxiliary image pixels are not similar, then a lower value is assigned to the first support value.

At block 210, the depth map application may generate the second support value based on depth values measured by the ToF camera. In one embodiment, the ToF camera may provide a depth value for each pixel in an image captured by the reference camera. However, as mentioned above, the depth value may not be accurate enough to generate a high-quality depth map. Accordingly, the depth estimate provided by the ToF camera may be fused with the other two depth calculation techniques discussed in method 200. As will be discussed in more detail in the description accompanying FIG. 4, the second support value may be generated by comparing the depth estimate provided by the ToF camera to the current depth plane being tested. If the depth estimate is close the current discrete depth plane, the second support value is high. However, the second support value decreases as the difference between ToF camera's depth estimate and the current depth plane being tested increase.

At block 215, the depth map application generates the third support value based on reprojecting a 3D point associated with a pixel of the reference image onto the auxiliary cameras. In this depth calculation technique, a point representing a pixel in the reference image at the current discrete plane depth being tested is projected onto the auxiliary camera images. Much like calculating the depth using MVS data at block 205, here, the value of the third support value ($E_{p,re}$) increases as the similarity of the colors between the pixel of the reference image and the corresponding pixels on the auxiliary images increases, and vice versa. A more detailed discussion of this technique is found in the description accompanying FIG. 5.

At block 220, the depth map application fuses or combines the three support value to generate a total support value for the current discrete depth. For example, if the depth map application has divided a depth volume in front of the reference camera ranging from 10 meters to 0.1 meters into a hundred different discrete depths, the application may repeat blocks 205-220 to generate a total support value $E_p(x)$ for each of the hundred depths. The depth application may then assign the depth of the pixel to the discrete depth with the highest total support value. Method 200 may then be repeated using the same discretization of the depth volume to assign a depth value to all the pixels in a reference image thereby creating a depth map for the image.

Although method 200 illustrates performing blocks 205-215 sequentially, it is specifically contemplated that the depth calculation techniques may be performed in parallel. That is, each depth calculation technique may be independent of each other, and thus, the depth map application may calculate the three support values simultaneously. Moreover, method 200 may be modified to fuse together the support values returned from only two of the depth calculation technique. For example, Equation 1 may be modified to calculate the total support based on fusing together only two of the three support values—e.g., the support value calculated based on comparing MVS data and the support value calculated from reprojecting a 3D point onto the auxiliary images. In one embodiment, if the auxiliary and reference cameras or homogenous (i.e., all the same type and model), only one of the depth calculations shown in blocks 205 and 215 may be needed. However, if the auxiliary cameras are different from the reference camera, then method 200 may perform both steps 205 and 215 to compensate for using lesser quality cameras as the auxiliary cameras, though this is not a requirement. One of ordinary skill in the art will recognize that other depth calculation techniques may also be used to generate additional support values for identifying the correct depth value for a pixel. Moreover, the selection of how many and what type of support values to use when calculating the total support value (i.e., the fused value) may be a function of the scene type (availability of discrimination features or degree of clutter), a function of time, or reference image region.

In one embodiment, the different cameras may be calibrated. As will be recognized by one of ordinary skill in the art, the reference, auxiliary, and depth cameras may be calibrated using any number of calibration techniques. The thermal camera may also be calibrated using, for example, a calibration target including a checkerboard pattern with heated resistors on the vertices. In addition to geometric calibration, a color calibration may also be performed to transform the color spaces of the auxiliary cameras to that of the reference camera.

Figure 3:
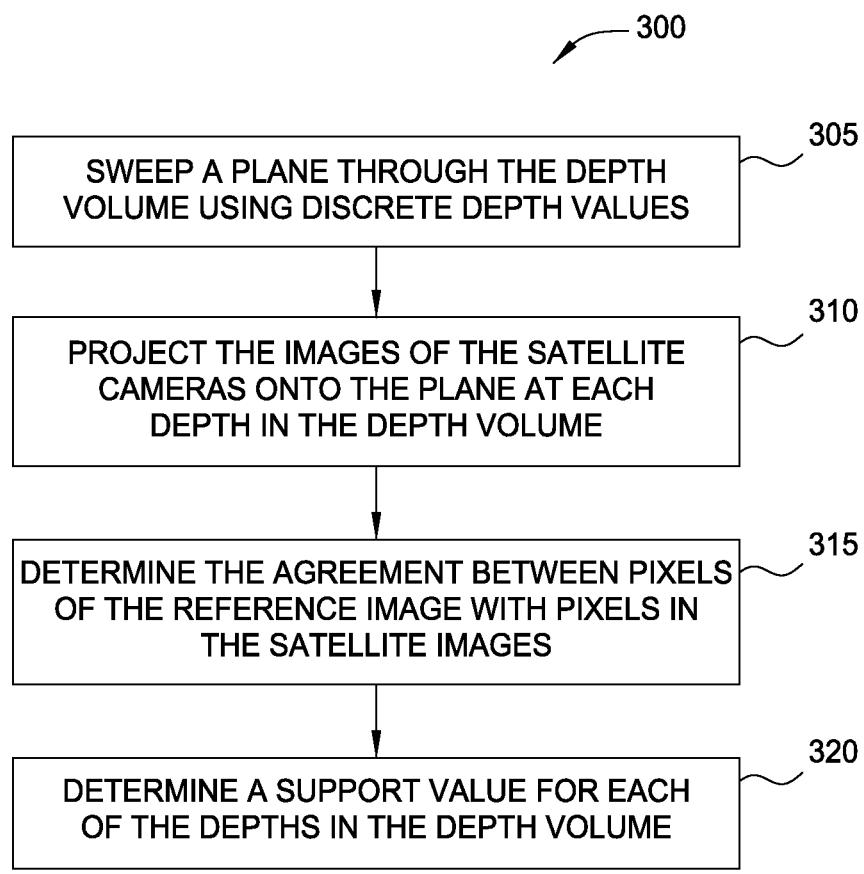
FIG. 3 illustrates a method for calculating a pixel depth value based on multi-view stereo data, according to one embodiment described herein.

FIG. 3 illustrates a method 300 for calculating a pixel depth value based on MVS data, according to one embodiment described herein. Generally, determining a depth based on the MVS data includes, for each discrete depth value, determining the similarities between pixels in the reference images to the corresponding pixels in the auxiliary images. One method to do this, is plane sweeping, though this is not the only technique that may be used to calculate depth based on MVS data. Instead, any method that uses a plurality of hypothesized depth values to determine similarities between pixel color may be used—e.g., modifying the images received from the respective cameras and sliding the images over each other.

At block 305, the depth map application may sweep through a plurality of discrete plane depths—e.g., the discrete depth planes that are used by Equation 1—to identify a total support value for a particular pixel at each discrete depth value. For example, the different discrete depths may divide the region in front of the reference camera into uniformly spaced planes. For each of the planes, at block 310, the depth map application projects the images of the auxiliary cameras onto the plane. That is, the depth map application assumes that the current depth plane is the correct depth plane, and based on this hypothesis, projects the auxiliary images (or a region thereof) onto the reference image that was captured at the same time as the auxiliary images using, for example, projection matrices computed during calibration. Projecting regions of the auxiliary images onto corresponding regions in the reference image may provide the benefit of accurately estimating similarities between regions of pixels where there is a boundary or edge (e.g., a color discontinuity) in the image or a region with a lot of texture.

At block 315, the depth map application determines the agreement between pixels of the reference image with pixels in the auxiliarys images. Specifically, the application may determine the similarities between the colors of the pixels. Where the system includes multiple auxiliary images, the depth map application may compare the color of a pixel of the reference image to the corresponding pixel on each of the auxiliary images. If the colors are different, then for that particular pixel, the depth plane is likely not the correct depth value. However, for a different pixel, the colors between the reference and auxiliary images may be similar thereby indicating that the current depth plane is a good estimate of the pixel's depth value.

In one embodiment, the depth map application may use normalize cross correlation (NCC) to determine the agreement between the pixels of the reference and auxiliary images. Here, NCC may be used to compensate for using heterogeneous visible light cameras to generate the MVS data. That is, in embodiments where the visible light cameras are homogenous, NCC may not be used. Generally, NCC may be used to account for the brightness differences between the heterogeneous cameras by normalizing their respective images. By normalizing the pixels, the color comparison may result in more accurate results. A more detailed explanation of different NCC techniques may be found in "Sensor Fusion for Depth Estimation, including ToF and Thermal Sensors" authored by Van Baar, Jeroen et al., 3*D Imaging, Modeling, Processing, Visualization and Transmission* (3*DIMPVT*), 2012 *Second International Conference on*, vol., no., pp. 472,478, 13-15 Oct. 2012 which is herein incorporated by reference.

At block 320, the depth map application determines the first support value for each of the discrete depths of the depth value. For example, after projecting the auxiliary images onto the reference image, the application may calculate the first support values for all the pixels in the reference image for that current discrete depth plane. The application may then project the auxiliary images onto the reference image based on a next depth plane and calculate first support values for this depth plane. Method 300 may continue until the application has calculated first support values for each discrete depth plane for each pixel in a reference image.

If NCC is used to normalize the images, the first support value of Equation 1 for a particular pixel at a particular depth plane may be calculated as follows:

$$E_{p,st} = \max(NCC, 0) \quad (2)$$

Here, the NCC values are limited from −1 to 1 and may be, for example, an average of the respective NCC values measured when comparing each of the auxiliary images to the reference image. In Equation 2, a NCC value of 1 may mean that the pixel of the reference image is very similar to the corresponding pixels in the auxiliary images while a NCC value of −1 means the pixels are very dissimilar. Accordingly, NCC values ranging from 1 to 0 increase the value of the first support value $E_{p,st}$ while values from 0 to −1 yield a minimum support value. Specifically, Equation 2 clamps the NCC values between 0 to −1 to the same value (e.g., zero) while NCC values greater than 0 increase the first support value. In this manner, the MVS data may be used to determine the likelihood that pixel is located at a particular discrete depth plane.

Moreover, the NCC values may also be used to perform occlusion reasoning—i.e., to determine if a particular background object is being occluded by a foreground object. As discussed above, the depth map application may generate respective NCC values by comparing the pixel in each of the auxiliary images to the corresponding pixel in the reference image which are then combined (e.g., averaged) to derive the NCC value shown in Equation 2. If the respective NCC values are substantially different, then one of the auxiliary cameras may be occluded. For example, the NCC value from comparing the auxiliary image from the rightmost camera to the reference image may be substantially different than the NCC value found by comparing the auxiliary image from the leftmost camera to the reference image because the rightmost auxiliary camera captures a pixel from a background object while the leftmost auxiliary camera is occluded and captures a pixel from a foreground object. The depth map application may determine the difference between the respective NCC values and compare the difference to a NCC threshold (e.g., 0.75). If the difference is greater than the threshold, then the NCC value that is furthest from 1—i.e., the auxiliary camera whose pixel is the least similar to the pixel in the reference camera—may be discarded. The non-discarded NCC values may then be used to derive the combined NCC value shown in Equation 2.

Figure 4:
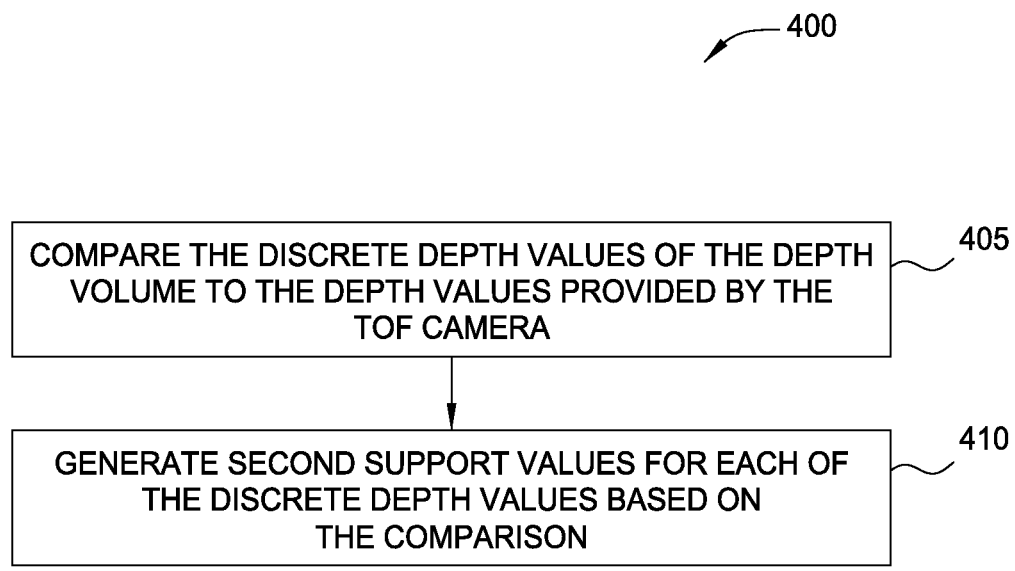
FIG. 4 illustrates a method for calculating a pixel depth value based on a ToF sensor, according to one embodiment described herein.

FIG. 4 illustrates a method 400 for calculating a pixel depth value based on a ToF camera, according to one embodiment described herein. Specifically, method 400 illustrates using the pixel depth value provided by the ToF camera to derive a second support value for a pixel at each discrete depth value. In one embodiment, the ToF camera provides the depth map application with a depth value of each pixel in the reference image. However, these values may not be accurate enough for some situations (e.g., adding special effects to a video). That is, the ToF camera may provide accurate depth values for general regions of the image but lack the ability to accurately determine depth for each pixel in a high resolution image.

At block 405, the depth map application may compare each of the discrete depth values to the depth value provided by the ToF camera. For example, the depth map application may compare the depth values measured by the ToF camera to depth planes that divide the depth volume—i.e., the same discrete depth planes used in the plane sweeping method described in FIG. 3. At block 410, the depth values may be compared to each of the discrete planes to determine the second support value of Equation 1 by performing the following calculation:

$$E_{p,ToF} = \exp\left(s \cdot \frac{\min(|D_i - D_{ToF}|, \tau)}{\sigma_{ToF}}\right) \quad (3)$$

Here, s is equal to $1/\tau$ where $\tau$ is threshold to clamp the depth difference, $\sigma_{ToF}$ is the expected variance of the recorded depth values, $D_i$ is the current discrete depth (i.e., the hypothesized depth), and $D_{ToF}$ is the depth value measured by the ToF camera. Generally, as the difference between the current discrete depth $D_i$ and the measured depth $D_{ToF}$ decreases, the second support value $E_{p,ToF}$ increases. The opposite is also true—as the difference between $D_i$ and $D_{ToF}$ increases, $E_{p,ToF}$ decreases. Accordingly, as each discrete depth value is considered, Equation 3 determines the likelihood that the discrete depth value is the correct depth value based on the depth measurement provided by the ToF camera. In this manner, the depth value measurement retrieved from the ToF sensor may be used to determine the correct depth plane for a particular pixel in the reference image.

Figure 5:
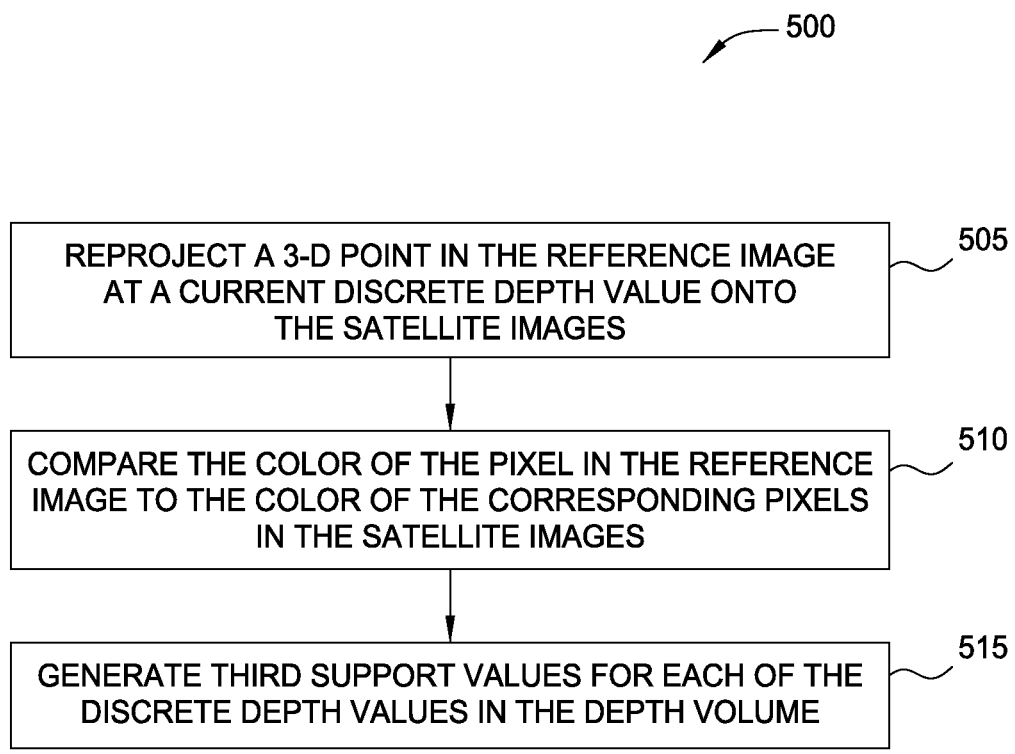
FIG. 5 illustrates a method for calculating a pixel depth value based on projecting a 3D point onto auxiliary images, according to one embodiment described herein.

FIG. 5 illustrates a method 500 for calculating a pixel depth value based on projecting a 3D point onto auxiliary images, according to one embodiment described herein. Method 500 is similar to method 300 of FIG. 3 in that method 500 also determines if a hypothesized depth estimate is correct by comparing the color of a pixel in a reference image to the color of the pixels in the auxiliary images. However, instead of projecting the auxiliary images onto the reference image, at block 505, a 3D point representing a pixel in the reference image at the current hypothesized depth plane is projected onto the auxiliary camera image planes. This projection of the 3D point may be performed using the projection matrices computed during calibration. Thus, method 500 differs from the projection done in method 300 since reprojection is done on a pixel-by-pixel basis rather then project a plurality of pixels onto another image (i.e., projecting the auxiliary images onto the reference image). Doing 3D point reprojection may provide the benefit of being able to estimate similarities between pixels where the image does not contain a lot of texture or where there is not a boundary or edge. For example, method 500 may provide a more accurate estimate of pixel similarity in a portion of the image that is a single color relative to using method 300 shown in FIG. 3.

At block 510, the depth map application compares the color of the pixel in the reference image to the color of the corresponding pixels in the auxiliary images. In one embodiment, the application may use NCC to normalize the pixels before doing the comparison. For example, near boundaries or in regions with color discontinuities, comparing pixels using method 500 may lead to erroneous results, but performing NCC and considering a window of pixels may yield a more reliable estimate of similarity. Thus, by fusing the support values found by using method 500 with the support values found by using method 300, a more accurate depth estimation may be calculated.

One example of calculating the third support value based on comparing the color of a pixel from the reference image to corresponding pixels in the auxiliary images is as follows:

$$E_{p,re} = \exp\left(-\left(\sum_{i=0}^{n}\left(\frac{|RGB_{ref} - RGB_{sat}|}{3}\right)\right)\bigg/\sigma_{re}\right) \quad (4)$$

At block 515, the third support value ($E_{p,re}$) is calculated based on the difference between the color of the reference pixel ($RGB_{ref}$) and the color of the corresponding auxiliary pixel ($RGB_{sat}$) as shown in Equation 4. The expected variance $\sigma_{re}$ is used to tune Equation 4. As the difference between the colors decreases, the third support value increases. Method 500 may repeat blocks 505-515 to calculate the third support value for each pixel in the reference image at each discrete depth plane of the depth volume.

Moreover, the depth map application may perform occlusion reasoning to determine if a particular background object is being occluded by a foreground object and whether a portion of the reprojection data should be ignored. After identifying the difference between the pixel color of the reference image and the colors of the corresponding pixels in the auxiliary images, the depth map application may compare these differences to a threshold. If a difference values exceed a threshold, the value may ignored, and thus, not considered when calculating $E_{p,re}$. That is, the depth map application assumes that if the threshold is exceeded, the view of that camera is occluded and is generating erroneous data. In this manner, occluded camera information may be filtered out to prevent this data from influencing the depth calculation of Equation 4.

In one embodiment, reprojecting a 3D point in the reference image onto the auxiliary images, however, may be performed only if the auxiliary cameras are different from the reference image. That is, if the visible light cameras are homogenous, then the depth map application may not perform method 500.

Based on the three support values calculated in methods 300, 400, and 500, Equation 1 provides a total support value for the current depth. As mentioned previously, the different support values may be calculated in parallel or sequentially. Once the total support value for each the discrete depths is calculated, the depth map application may assign the depth plane with the greatest depth value as the depth of the pixel.

Figure 6:
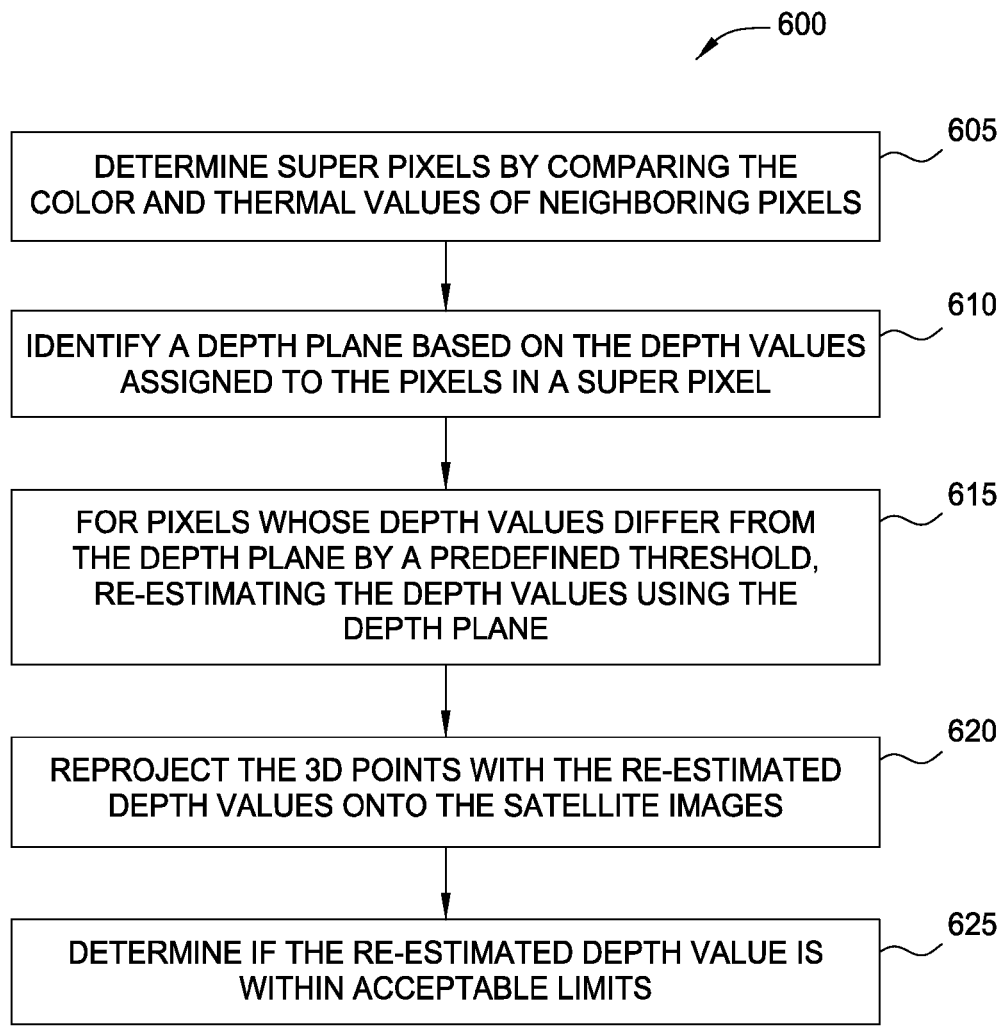
FIG. 6 illustrates adjusting pixel depth values using data received from a thermal sensor, according to one embodiment described herein.

FIG. 6 illustrates adjusting pixel depth values using data received from a thermal sensor, according to one embodiment described herein. In one embodiment, method 600 may be performed after the depth map application has calculated a depth value for each of the pixels in the reference image based on Equation 1. These depth assignments may then be organized into a depth map associated with the image. However, the depth values in the depth map may be noisy. To reduce the noise, the depth map application may perform an iterative plane fitting technique which is illustrated by method 600. Note that in one embodiment, the plane fitting technique may not be used to adjust the depth values in the depth map. Rather, the depth map application may use method 600 selectively only on certain areas of the map.

At block 605, the depth map application may group the pixels into super pixels (or segments) by identifying pixels with similar color and thermal values. That is, the thermal values provided by thermal camera 120 in FIGS. 1A-1C may be combined with the color information of the pixel to group neighboring pixels into a super pixel. For example, if a person in the reference image is wearing a shirt that is the same or similar color as background object, just comparing the color of the pixels associated with the person to the color of the pixels associated with the background object may result in grouping them into a super pixel. However, these pixels are likely at completely different depths. Instead, by using the thermal values as part of the criteria for grouping the pixels, the depth map application can determine that the pixels associated with a human being (which has a high thermal value) are not similar to pixels of the background object (assuming a low thermal value). Accordingly, using the thermal values may decrease the likelihood that pixels with similar colors but different depths are incorrectly placed in the same super pixel.

At block 610, the depth map application may identify a depth plane for the super pixels based on the depth values assigned to the pixels in the depth map. Stated differently, the application may use the discrete depth value associated with the pixels in the super pixel to generate a plane in 3-D space that represents the depth of the super pixel. The embodiments herein are not limited to any particular method for approximating a plane using a plurality of individual measurements.

If an image is well approximated by planar segments, plane fitting may achieve high-quality results. However, if the image is cluttered or contains detailed objects in the background which are not well approximated by planes, then plane fitting may not be a good tool for adjusting plane depths. In one embodiment, the depth map application may discard a depth plane if the plane is slanted, relative to a ground plane, more than a threshold—e.g., more than 45 degrees. Or, if the depth values of the pixels in a super pixel are too varied—e.g., the standard deviation of the depth values exceeds a predefined threshold—the depth map application may not attempt to adjust the depth values using the plane fitting technique.

At block 615, for pixels whose depth values differ from the depth plane by a predefined threshold, the depth plane application may re-estimate the depth value using the depth plane. That is, the application may use the depth plane to identify outliers whose depth values substantially deviate from the depth plane. In one embodiment, plane fitting is performed based on the assumption that pixels that are similar—i.e., are located proximate to each other, have similar color, and have similar thermal values—should also have similar depths. If a pixel's depth deviates widely from the depth plane, the depth map application may re-calculate the assigned depth to be closer to the value dictated by the depth plane. This may be done, for example, by simply assigning the depth value of the depth plane at the pixel location as the new depth value or by averaging the current depth value of the pixel with the depth value indicated by the depth plane.

At block 620, the depth map application may reproject the 3D points of the pixels onto the auxiliary images using the re-estimated depth value. For example, the application may perform the process described in blocks 505 and 510 of FIG. 5 to determine if the new depth value is accurate. At block 625, the depth map application determines if the colors of the pixel at the new depth sufficiently match the color of the corresponding pixels from the auxiliary images. If so, the depth map application may assign the re-estimated depth value as the depth value for the pixel in the depth map.

Method 600 may also consider whether the super pixel is within an occlusion region. Here, the depth application may compare the color consistency for the left and right auxiliary cameras. In addition, the depth map application may determine if one of the pixels in the auxiliary image is occluded by comparing the depth values. The application may overwrite the current depth value whenever a smaller depth value reprojects to a particular auxiliary. Namely, by comparing depth values, the application determines if a particular pixel projected onto the auxiliary image is behind or farther from the reference camera than the corresponding pixel in the auxiliary image. If so, the auxiliary camera is likely occluded. If, however, the pixel is in front of the pixel in the auxiliary image, then the auxiliary camera is likely not occluded and the depth value is set as the new closest depth for subsequent tests.

In addition to performing the plane fitting technique shown in method 600, the depth map application may smooth the depth values in the depth map. Because of the discrete nature of the depth assignments—i.e., the depth planes are not continuous but rather are chosen from the plurality of depth planes dividing up the depth volume—the depth map application may smooth the depth values using a smoothing technique. Smoothing the depth values may be especially useful for regions of an image that include curved surfaces or sharply angled objects. In one embodiment, the filtering technique may be modified to include the thermal image for determining the similarity of neighboring pixels. A more detailed explanation of the smoothing process may be found in "Sensor Fusion for Depth Estimation, including ToF and Thermal Sensors" which was referenced earlier.

Figure 7:
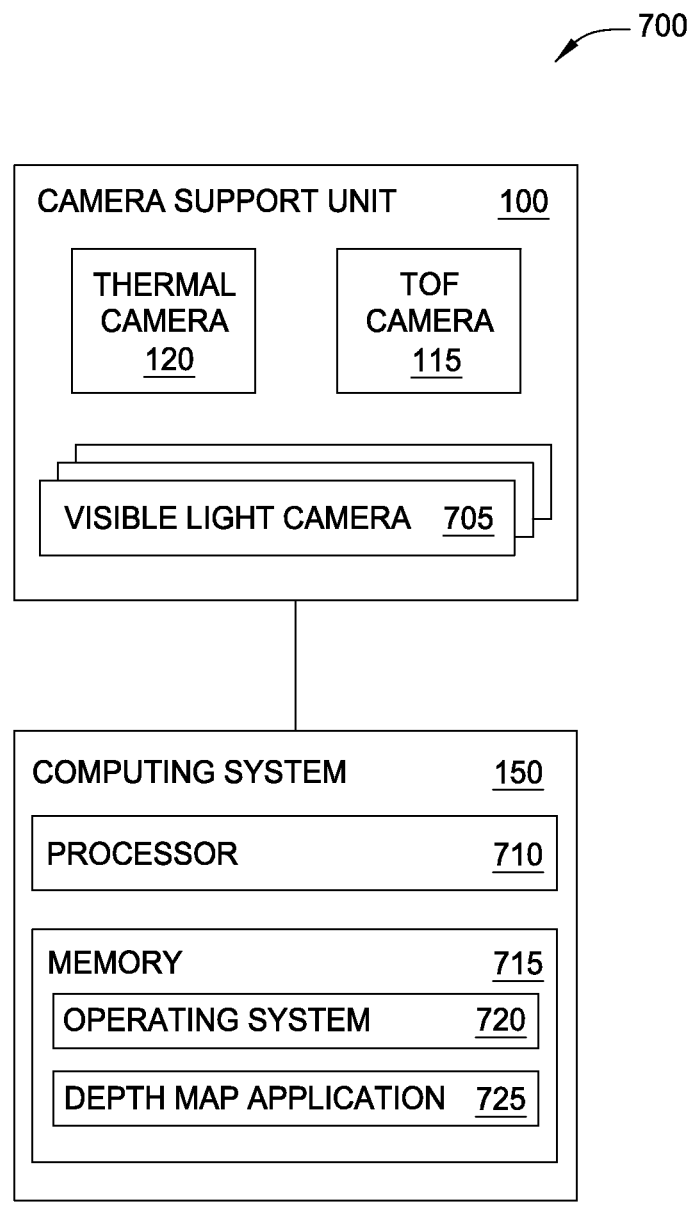
FIG. 7 illustrates a system diagram for fusing data from sensors of different modalities, according to one embodiment described herein.

FIG. 7 illustrates a system diagram for fusing data from sensors of different modalities, according to one embodiment described herein. The system 700 includes the camera support unit 100 which may physically support thermal camera 120, ToF camera 115, and one or more visible light cameras 705 (i.e., a reference camera along with one or more auxiliary cameras). The computing system 150 may be directly coupled to the various cameras attached to the camera support unit 100 or indirectly coupled to the cameras via the camera support unit 100. For example, the camera support unit 100 may include a single electrical connection that allows the computing system 150 to communicate with each of the cameras rather than having a separate communication channel for each camera.

Computing system 150 includes a processor 710 and a memory 710. Processor 710 may represent one or more single or multi-core processing elements that are capable of performing the functions described herein. Memory 710 may include volatile memory elements, non-volatile memory elements, or both. For example, memory 710 may include a main memory (e.g., RAM or Flash memory) as well as non-volatile storage elements (e.g., a hard disk drive). As shown, memory 710 includes an operating system 720 and a depth map application 725. The operating system 720 may be any operating system capable of executing the depth map application 725 and its functions described herein. Even though FIG. 7 illustrates depth map application 725 as software, all or some portion of the application 725 may be executed using firmware or hardware.

Additionally, system 700 may be modified such that camera support unit 100 and computing system 150 may be, at least partially, integrated into a single unit. For example, some of the functions performed by the depth map application 725 may instead be implemented using software or hardware on the individual cameras. Moreover, the depth map application 725 may execute in real-time—as the cameras capture data—such that the depth maps associated with the reference images are computed as the cameras capture data. Alternatively, the depth map application 725 may execute while the cameras are not currently capturing additional data.

CONCLUSION

To generate a pixel-accurate depth map, in one embodiment, ToF data from a ToF sensor is combined with data from multiple cameras to produce a high-quality depth measurement for pixels in the reference image. To do so, a depth measurement system may use a plurality of cameras mounted on a support structure to perform a depth hypothesis technique (e.g., plane sweeping) to generate a first depth-support value. Furthermore, the apparatus may include a mounted ToF sensor which generates a second depth-support value based on depth estimates provided in the ToF data. In addition, the depth measurement system may project a 3D point (i.e., a pixel at a particular depth) from a reference image captured by the reference camera onto auxiliary images captured by the auxiliary cameras. By comparing the color of the corresponding pixels in the auxiliary images with the color of the 3D point in the reference image, the system generates a third depth-support value. The system may then combine (i.e., fuse) these support values for each pixel in a reference image to determine respective depth values. Using these values, the system may generate a depth map for the image.

In one embodiment, the depth-measurement system may perform a plane fitting technique for further adjusting the depth values in the depth map. Generally, plane fitting involves grouping a plurality of pixels into a super pixel based on the similarities in color. However, because different layers in an image may have the same color (e.g., a person may be wearing clothes that match the color of the background), the system may also use data from a thermal sensor when grouping the pixels. That is, the thermal value assigned to each pixel may be used as a separate factor when grouping the pixels into super pixels. Once grouped, the system may assign a depth plane to the pixels and adjust the depth values of pixels that substantially vary from this depth plane.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for calculating a depth value for a pixel in a reference image, the method comprising:
  receiving the reference image captured by a reference camera and at least one auxiliary image captured by an auxiliary camera;
  generating a first support value indicating whether the pixel in the reference image is at a particular depth, relative to the reference camera, based on comparing a region of the auxiliary image captured by the auxiliary camera with a region of the reference image captured by the reference camera;
  providing a depth estimate of the pixel from a range-estimation camera;
  generating a second support value indicating whether the pixel in the reference image is at the particular depth based on comparing the depth estimate from the range-estimation camera to the particular depth;
  generating a third support value indicating whether the pixel is at the particular depth based on projecting a 3D point, corresponding to the pixel in the reference image, onto the auxiliary image; and
  fusing, by operation of one or more computer processors, the first, second, and third support values to generate a total support value for the pixel at the particular depth.

2. The method of claim 1, further comprising:
  calculating respective first, second, and third support values for the pixel at each of a plurality of discrete depths that divide a depth volume; and fusing the respective first, second, and third support values to generate a respective total support value for each of the plurality of discrete depths; and selecting the depth value for the pixel based on the discrete depth associated with the greatest respective total support value.

3. The method of claim 2, further comprising:

selecting respective depth values for a plurality of pixels in the reference image based on calculating first, second, and third support values at each of the plurality of discrete depths; and generating a depth map associated with the reference image using the respective depth values.

4. The method of claim 1, wherein generating the first support value comprises:

projecting the auxiliary image, at the particular depth, onto the reference image; and determining the first support value based on comparing a feature of a plurality of pixels in the reference image to a feature of a corresponding plurality of pixels in the reference image.

5. The method of claim 1, wherein generating the third support value comprises:

determining the third support value by comparing the color of the pixel in the reference image with a corresponding pixel in the auxiliary image.

6. The method of claim 1, further comprising:

generating a depth map by selecting respective depth values for a plurality of pixels in the image;

forming a super pixel comprising a plurality of pixels in the reference image based on features extracted from the reference image and a corresponding thermal image;

determining a depth-plane of the super pixel based on the depth values of the plurality of pixels; and adjusting at least one of the depth values based on the depth-plane.

7. The method of claim 1, wherein the reference camera, auxiliary camera, and range-estimation camera are mounted on a common support structure.

8. A computer program product for calculating a depth value for a pixel in a reference image, the computer program product comprising:

a non-transitory computer-readable storage medium having computer-readable program code embodied therewith, the computer-readable program code configured to:

receive the reference image captured by a reference camera and at least one auxiliary image captured by an auxiliary camera;

generate a first support value indicating whether the pixel in the reference image is at a particular depth, relative to the reference camera, based on comparing a region of the auxiliary image with a region of the reference image;

provide a depth estimate of the pixel from a range-estimation camera;

generate a second support value indicating whether the pixel in the reference image is at the particular depth based on comparing the depth estimate from the range-estimation camera to the particular depth;

generate a third support value indicating whether the pixel is at the particular depth based on projecting a 3D point, corresponding to the pixel in the reference image, onto the auxiliary image; and fuse the first, second, and third support values to generate a total support value for the pixel at the particular depth.

9. The computer program product of claim 8, wherein the computer-readable program code is further configured to:

calculate respective first, second, and third support values for the pixel for each of a plurality of discrete depths that divide a depth volume; and fuse the respective first, second, and third support values to generate a respective total support value for each of the plurality of discrete depths; and select the depth value for the pixel based on the discrete depth associated with the greatest respective total support value.

10. The computer program product of claim 9, wherein the computer-readable program code is further configured to:

select respective depth values for a plurality of pixels in the reference image based on calculating first, second, and third support values at each of the plurality of discrete depths; and generate a depth map associated with the reference image using the respective depth values.

11. The computer program product of claim 8, wherein generating the first support value comprises computer-readable program code further configured to:

project the auxiliary image, at the particular depth, onto the reference image; and determine the first support value based on comparing a feature of a plurality of pixels in the reference image to a feature of a corresponding plurality of pixels in the reference image.

12. The computer program product of claim 8, wherein generating the third support value comprises computer-readable program code further configured to:

determine the third support value by comparing the color of the pixel in the reference image with a corresponding pixel in the auxiliary image.

13. The computer program product of claim 8, wherein the computer-readable program code is further configured to:

generate a depth map by selecting respective depth values for a plurality of pixels in the image;

form a super pixel comprising a plurality of pixels in the reference image based on features extracted from the reference image and a corresponding thermal image;

determine a depth-plane of the super pixel based on the depth values of the plurality of pixels; and adjust at least one of the depth values based on the depth-plane.

14. A system, comprising:

a common support structure comprising:
a reference camera,
at least one auxiliary camera, and
a range-estimation camera; and a computing device communicatively coupled to the reference, auxiliary, and range-estimation cameras, the computing device configured to:

calculate a first support value indicating whether a pixel in a reference image captured by the reference camera is at a particular depth, relative to the reference camera, based on comparing a region of the reference image with a region of an auxiliary image captured by the auxiliary camera;

calculate a second support value indicating whether the pixel in the reference image is at the particular depth based on comparing a depth estimate from the range-estimation camera to the particular depth;

calculate a third support value indicating whether the pixel is at the particular depth based on projecting a 3D point, corresponding to the pixel in the reference image, onto the auxiliary image; and fuse the first, second, and third support values to generate a total support value for the pixel at the particular depth.

15. The system of claim 14, wherein the computing device is further configured to:

calculate respective first, second, and third support values for the pixel for each of a plurality of discrete depths that divide a depth volume;

fuse the respective first, second, and third support values to generate a respective total support value for each of the plurality of discrete depths; and select the depth value for the pixel based on the discrete depth associated with the greatest respective total support value.

16. The system of claim 15, wherein the computing device is further configured to:

select respective depth values for a plurality of pixels in the image based on calculating first, second, and third support values at each of the plurality of discrete depths; and generate a depth map associated with the image using the respective depth values.

17. The system of claim 14, wherein the support structure includes at least two auxiliary cameras, wherein a first one of the auxiliary cameras is positioned on a first side of the reference camera and a second one of the auxiliary cameras is positioned on a second side of the reference camera opposite of the first side.

18. The system of claim 14, wherein the support structure includes a thermal camera, wherein the thermal camera is configured to provide thermal data associated with the image to the computing device.

19. The system of claim 14, wherein calculating the first support value comprises:

projecting the auxiliary image, at the particular depth, onto the reference image; and determining the first support value based on comparing a feature of a plurality of pixels in the reference image to a feature of a corresponding plurality of pixels in the reference image.

20. The system of claim 14, wherein calculating the third support value comprises:

determining the third support value by comparing the color of the pixel in the reference image with a corresponding pixel in the auxiliary image.

* * * * *